April 28, 1959     H. E. STEVENS     2,884,606
BI-DIRECTIONAL SAMPLING DEVICE FOR INSERTION IN
HIGH-FREQUENCY COAXIAL TRANSMISSION LINE
Filed Jan. 30, 1957     2 Sheets-Sheet 1
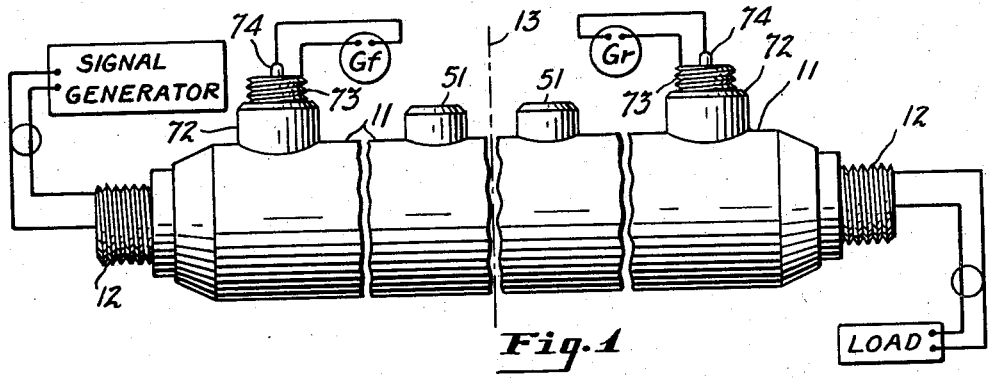
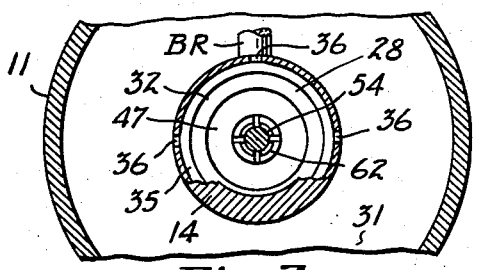
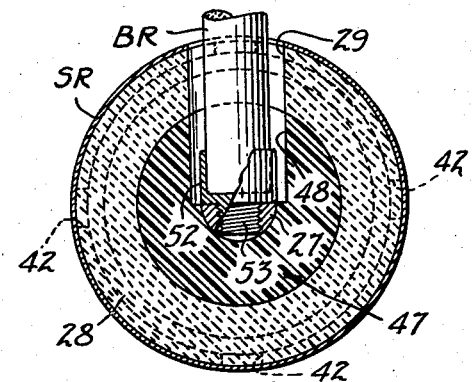
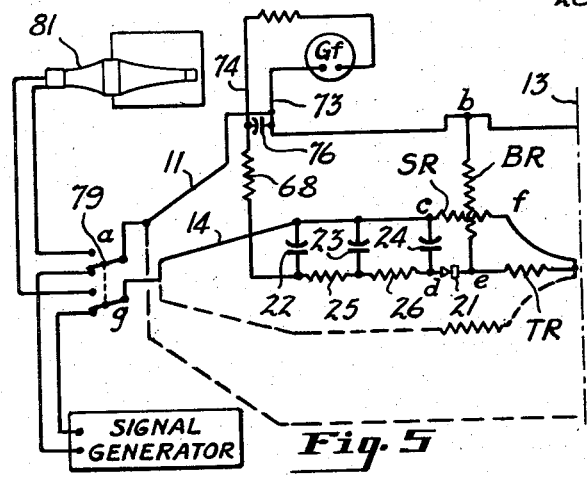
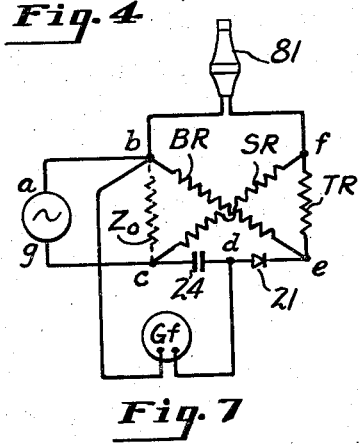
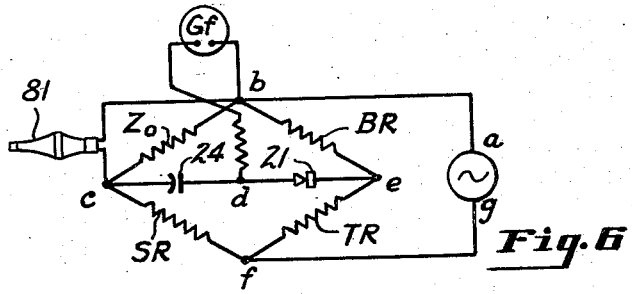
INVENTOR.
Harold E. Stevens
BY Bosworth, Sessions,
Herrstrom and Knowles
ATTORNEYS April 28, 1959

H. E. STEVENS 2,884,606

BI-DIRECTIONAL SAMPLING DEVICE FOR INSERTION IN
HIGH-FREQUENCY COAXIAL TRANSMISSION LINE

Filed Jan. 30, 1957

INVENTOR
*Harold E. Stevens*
BY *Bosworth, Sessions,*
*Herrstrom and Knowles*
ATTORNEYS United States Patent Office 2,884,606
Patented Apr. 28, 1959

2,884,606

BI-DIRECTIONAL SAMPLING DEVICE FOR INSERTION IN HIGH-FREQUENCY COAXIAL TRANSMISSION LINE

Harold E. Stevens, Lyndhurst, Ohio, assignor to Bird Electronic Corporation, Cleveland, Ohio, a corporation of Ohio Application January 30, 1957, Serial No. 637,306

12 Claims. (Cl. 333—81)

This invention relates to indicators or meters for high frequency electrical energy and more particularly to the sampling for measurement and like purposes of wave energy transmitted along a coaxial line.

An object of the invention is to provide an improved hollow type of center conductor and mounting structure for the rectifier and sampling resistor in a center conductor for use in an insertion type measuring unit.

A further object is to provide a center conductor structure suitable for a non-frequency selective coupler or sampler.

Still another object is to provide center conductor means suitable for a directional type coupler or sampler.

Other and further objects, features, and advantages of the invention will become apparent as the description proceeds.

The center conductor means constituting the subject matter of this application is suitable for use in insertion devices of the general type described in the copending application of James R. Bird and Harold E. Stevens, Serial No. 224,762, filed May 5, 1951. Reference is also made to my copending applications for Patent Serial No. 637,308, filed January 30, 1957, for Bi-Directional Single Unit Sampling Device and Serial No. 637,307, filed January 30, 1957, for Unidirectional Sampling Device for Insertion in High-Frequency Coaxial Electrical Transmission Line. However, structural features of the center conductor means described herein may also be used in non-directional couplers or insertion devices.

In insertion meters, the measurement of electrical quantities such as power, voltage or current in a radio frequency system is accomplished by rectifying a sample of the radio frequency energy and directing the sample of energy through a direct-current measuring or indicating circuit externally of the coaxial line unit which has been inserted in the radio frequency system.

One of the features of the measuring arrangement of insertion meters such as described in the aforesaid Bird and Stevens application is the mounting of the rectifier within the center conductor of the insertion unit to minimize radio frequency inductive or interference effects between the radio frequency and direct-current circuits. Accordingly, connections for the direct-current electrical circuit are brought across the space between the outside and center conductors of the insertion unit. In measuring current or power, a series resistor is included in the radio frequency circuit of the center conductor which must also be included in the direct-current circuit. In order to obtain the response in the direct-current circuit which most faithfully represents the actual magnitude of the radio frequency quantity, it is desirable to make the direct-current connections for sampling voltage physically as close to the series current sampling resistor as possible. Accordingly, in accordance with the present invention, the sampling resistor is made annular in form, being interposed in a section of the center conductor of the insertion unit and is provided with a radial aperture through which a direct-current connection may be made.

A better understanding of the invention will be afforded by the following detailed description of suitable embodiments considered in conjunction with the accompanying drawings forming a part of the specification.

In the drawings:

Figure 1 is a side view, partially schematic in the representation of electrical circuits of an insertion device for making measurements in high frequency coaxial line apparatus;

Figure 3 is a view of a cross section of the apparatus of Figures 1 and 2 represented as cut along the irregular line indicated at 3—3 of Fig. 2;

Figure 4 is a view of a cross section of the center conductor and a fragmentary view of the apparatus of Figures 1 and 2 represented as cut by a plane along the line 4—4 of Fig. 2;

Figure 5 is a schematic circuit diagram of the portion of the apparatus of Figure 1 represented in Figure 2, constituting approximately one-half of the structure shown in Figure 1;

Figure 2:
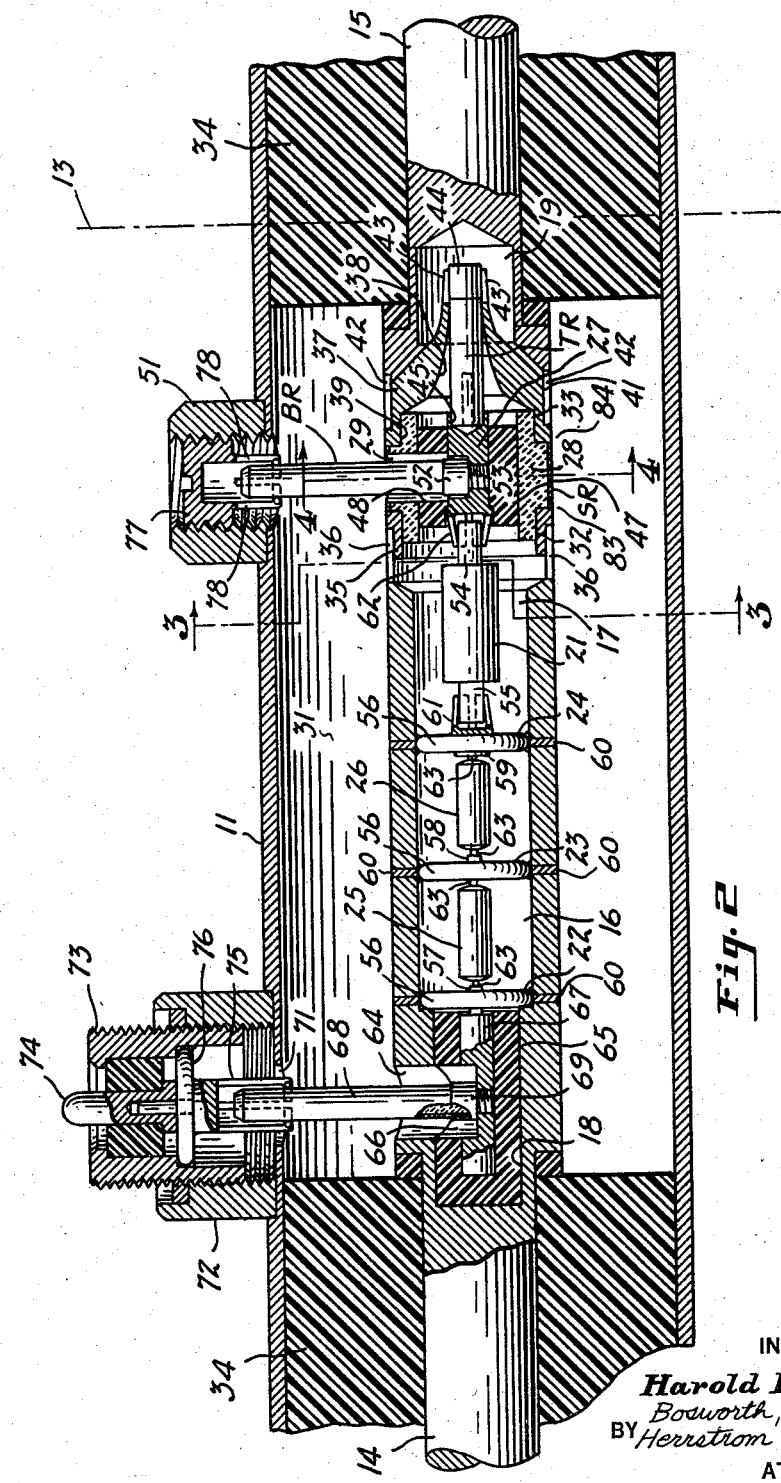
Figure 2 is a fragmentary view of a longitudinal section of the apparatus of Figure 1 represented as cut by a plane passing through the longitudinal axis of the unit of Fig. 1.

Figure 6 is a circuit diagram illustrating the effective electrical circuit with respect to a direct-current indicating instrument with radio frequency energy traveling from the right hand end of the apparatus of Figures 1 and 2 to the left hand end as seen in the drawing; and Figure 7 is a corresponding circuit diagram representing the effective circuit with respect to radio frequency energy traveling in the opposite direction, Figure 6 being represented in the form of a bridge circuit to illustrate the null effect of reflected energy in a perfectly matched radio frequency system, and Figure 7 being redrawn as a lattice type of circuit in which the direct-current circuit is unbalanced and measurement is obtained of the full magnitude of the energy traveling in a forward direction in a perfectly matched radio frequency system.

Like reference characters are utilized throughout the drawings to designate like parts.

The form of insertion unit illustrated in Figs. 1 and 2 comprises an outside hollow cylindrical conductor 11 with center conductor means and conventional coaxial line connector units 12 at the ends, the units 12 being alike and the entire device being symmetrical with respect to an imaginary transverse center plane 13 so that the unit may be turned end for end without changing operating effect.

The center conductor means comprises physically separate conductor rods 14 and 15 with an additional conductor rod similar to the rod 14 but not shown in the fragmentary view of Fig. 2, which includes only those portions of the apparatus of Fig. 1 to the left of the imaginary transverse plane 13. Included also is a series resistor SR electrically joining the conductor rods 14 and 15. A similar series resistor (not visible in the drawings) connects the conductor rod 15 to an end conductor rod which corresponds to the conductor rod 14.

The end conductor rod 14 and its counter part at the other end of the unit, not shown, has a cylindrical chamber 16 coaxial therewith extending from an open end 17 of the rod 14 to the bottom or closed end 18 of the chamber 16. The conductor rod 15 also has a small end socket or chamber 19, the two chambers 16 and 19 together, in effect, forming a hollow region or general chamber in the center conductor means for receiving the series resistor SR, a terminating resistor TR, a rectifier 21, a resistance-capacity filter unit comprising one or more button type condensers 22, 23 and 24, and one or more filter resistors 25 and 26, as well as receiving an internal contact fitting 27 for the terminating resistor TR, all of which parts serve the general purpose of corresponding elements in the insertion device disclosed in the aforesaid copending Bird and Stevens application.

In the improved structure disclosed in the present application, however, the series resistor SR constitutes an annulus 28, the peripheral portions of which are composed of resistor material surrounding, if desired, an insulating base or, as shown in the specific embodiment illustrated, the entire annulus 28 comprising resistance material. Moreover, a further distinguishing feature of the series resistor SR is that the contact fitting 27 for electrically joining the terminating resistor TR and the rectifier unit 21 is mounted within the resistance annulus 28 and the annulus 28 is provided with a radial aperture 29 to enable a direct-current circuit connection to be brought out directly from the center of the series resistor SR through the region 31 between the center conductor means and the outside conductor 11, to or through the outside conductor 11 as will be described more fully hereinafter.

Preferably, as illustrated, the annulus 28 has reduced diameter end portions 32 and 33 and the adjacent hollow ends of the conductor rods 14 and 15 are counterbored or provided with suitable intermediate fittings to fit over the end portions 32 and 33 of the annulus 28, the maximum diameter of which corresponds to the outside diameter of the hollow portions of the center conductor rods 14 and 15 so as to form a continuous center conductor means without discontinuity within the air or fluid filled region 31. It will be understood that locating and supporting tubular insulators 34 may be employed and that the portions of the center conductor rods 14 and 15 within the insulators 34 may be of less diameter than the remainder of the center conductor means in order to allow for the difference in dielectric properties of the tubular insulators 34 and the space 31.

Although the reduced diameter portion 32 of the annulus 28 may be fitted directly into a counterbore of the conductor rod 14, preferably a metallic connection ferrule or the like 35 is employed which makes a press fit upon the reduced diameter portion 32 of the annulus 28 for good electrical contact, and the end of the chamber 16 is provided with slots 36 for resiliently grasping the ferrule 35 to facilitate quick assembly of the resistor unit with the center conductor rod 14 after the other parts have been placed within the chamber 16.

For supporting the terminating resistor TR coaxially within the center conductor means and providing a reflectionless termination in the minor coaxial line formed between the center conductor rod means and the resistor rod TR, a tapered connection unit 37 is provided. The unit 37 has an internal taper 38 curved in the manner disclosed in the copending application, Serial No. 692,116, filed August 21, 1946. The unit 37 is provided with a counterbore or mouth 39 of suitable diameter to make a press fit over the reduced diameter end portion 33 of the resistive annulus 28 at the larger diameter end of the taper 38. A portion of the periphery of the connection unit 37 is reduced in diameter as shown at 41 to receive spring fingers formed by cutting slots 42 in the end of the conductor rod 15, so that, as shown in the drawings, the entire portion of the external surface of the center conductor means within the space 31 is of uniform diameter lying along a cylindrical surface coaxial with the outside conductor 11 to avoid discontinuity effects.

In the smaller diameter end of the tapered bore 38 of the connection unit 37 slots may be provided or spring fingers 43 may be formed to receive resiliently a conductive band 44 coated on one end of the resistor rod TR for making electrical connection between the end of the rod 44 and the center conductor rod 15 where it joins electrically the series resistor SR. A contact socket 45 is also formed in the contact fitting 27 within the resistor annulus 28 for supporting and locating the other end of the terminating resistor rod TR.

Although the annulus 28 may constitute insulator material coated or peripherally impregnated with resistance material to form a unit with a peripheral resistance, in the specific construction illustrated, an annular insulator or insulator tube 47 is provided fitting within the annulus 28 and receiving the contact fitting 27. The annular insulator 47 has a radial aperture 48 registering with the aperture 29 in the resistance annulus 28 in order to permit an access resistor or bridging resistor BR to extend from the contact fitting 27 to a boss 51 mounted on the outside conductor 11, the access resistor BR constituting, with the terminal resistor TR, a voltage divider for obtaining in the resistor TR a sample of the voltage existing between the center conductor means and the outside conductor 11 at the same point physically within the space 31 where the series current sampling resistor SR is located. As shown, the inner end of the voltage dividing resistor BR is encased in a metallic socket unit 52 having a threaded portion 53 fitting in transverse bores provided therefor in the contact fitting 27.

The rectifier unit 21 may be of conventional type having aligned end contact pins 54 and 55, a suitable arrangement comprising a germanium pellet contacted by a platinum ruthenium whisker wire. The so-called welded germanium diodes, type G7, manufactured by General Electric Company, Syracuse, New York, are satisfactory. The germanium pellet and the whisker wire are encased in the insulating body of the rectifier 21 and are connected to projecting pins 54 and 55 as will be well understood by those skilled in the art.

The condensers 22, 23 and 24 are of the conventional concentric terminal type having peripheral terminals 56 and annular center terminals 57, 58 and 59. The terminals 56 electrically contact the surface of the chamber 16 are bonded by solder 60 flowed in through radial drill holes in and thereby make electrical connection with the center conductor rod 14. The center terminal 59 of the button condenser 24 has secured thereto as by soldering or the like a socket contact 61 and a similar socket contact 62 is formed at the left hand end of the contact fitting 27 within the annular series resistor SR. This enables the rectifier 21 to be assembled and supported in spaced relation coaxially within the hollow portion of the center conductor rod 14 by insertion of the pins 54 and 55 in the contact sockets 61 and 62 after the filter unit has been inserted in place. The filter resistors 25 and 26 have conventional end pin contacts 63 fitting into and electrically contacting the center terminals 57, 58 and 59 of the button condensers 22, 23 and 24 in a conventional manner.

For enabling a second electrical connection to be brought out from the interior of the conductor rod 14 and completing an external direct-current circuit through the rectifier 21 and the sampling resistors TR, SR and BR, a radial aperture 64 is formed in the end 18 of the chamber 16. A hollow insulator 65 is mounted within the end 18 of the chamber 16 having a radial aperture 66 registering with the aperture 64 and a contact fitting 67 is mounted or imbedded within the insulator 65. A second access resistor 68 is provided having a metallic end socket fitting 69 fastened in and electrically connected to the contact fitting 67, and the contact fitting 67 is also electrically connected to the center terminal 57 of the button type filter condenser 22 adjacent thereto by soldering, brazing, the use of an extending insertion pin, or the like. The second access resistor 68 extends through an opening 71 in the outside conductor 11 to a boss 72. One of the bosses 51 and 52 is provided with direct-current coaxial connection fittings for connection to a conventional galvanometer or direct-current indicating, recording or relay device.

In the arrangement illustrated, the boss 72 is provided with a direct-current indicator connection fitting including a threaded annular contact 73 and a center pin contact 74, contact 73 being electrically connected to the outside conductor 11 through the boss 72 and the center pin contact 74 being electrically connected to the upper end of the access resistor 68 by a spring finger type of socket contact 75. A conventional bypass condenser 76 is preferably provided, taking the form of a button condenser with the outer peripheral terminal connected to the annular contact 73 and the inner or center terminal being electrically connected to the center pin contact 74 and the spring finger contact socket 75. The electrical circuit is then completed by the connection of the outer end of the access or bridging resistor BR to the outside conductor 11 through a headless screw 77 threaded into the boss 51 and carrying spring fingers 78 serving as a contact socket to receive the outer end of the resistor BR.

It will be understood that the insertion unit illustrated in Fig. 1, as in the case of the apparatus disposed in the aforesaid copending application of Bird and Stevens, is interchangeable end for end having bosses 72 at either end for receiving direct-current connection fittings 73, 74. The fittings 73, 74 are shown in Fig. 1 as connected electrically to forward and reverse energy measuring indictors of galvanometers $Gf$ and $Gr$, respectively, with a signal generator connected to one coaxial line fitting 12 and the load connected to the other line fitting 12 at the other end, but functioning in the same manner if the unit is reversed end for end without change of physical location of the signal generator and the load; in which case the function of the galvanometers $Gf$ and $Gr$ would be reversed, the one at the end of the unit toward the signal generator serving to read forward energy and the other one serving to read reflected energy. Since the apparatus is symmetrical end for end, only the left hand end is represented by the circuit diagram in Fig. 5 where the elements to the left of the imaginary plane 13 are represented by electrical symbols.

To illustrate schematically the fact that the relationship to the signal generator and the load may be interchanged, a double-throw switch 79 has been shown, whereby the outside conductor 11 and the center conductor rod 14, at points $a$ and $g$ respectively, may be connected either to the signal generator with the switch 77 in the position shown, or to a load 81 with the double throw switch 79 moved to the upper position. The load 81 is shown in the form of a conventional reflectionless termination unit. It will be understood that the apparatus is so designed that the surge impedance $Zo$ of the coaxial lines employed in the system, the termination unit 81, and the insertion unit itself are all equal and the impedance of the terminating resistor TR is chosen to equal this same value. As shown in Fig. 5, a direct-current circuit through the forward power reading indicator $Gf$ is formed from the point $b$ through the bridging resistor BR to a point $e$ which is within the contact fitting 27, the rectifier 21 to point $d$, the filter resistors 26 and 25, and the access resistor 68. The condenser 24 serves as a peaking condenser for producing a direct-current voltage measured by the galvanometer $Gf$ representing a sample of the radio frequency energy. There is a series radio frequency circuit through the resistor SR, and the bridging or voltage sampling radio frequency circuit is from the point $b$ through the voltage-divider bridging BR and the terminating resistor TR to the point $f$ on the center conductor so that a voltage sample is produced in the resistor TR. The resistor BR is in series with the resistor TR across the peaking condenser 24 and the rectifier 21; the condenser 24 is changed to a value representing a function of simultaneous instantaneous values of both voltage and current, or directional power. If it is desired to measure only current and not power, the terminating resistor TR may be replaced by a conductor rod, in which case the sample produced by the peaking condenser 24 is proportional to radio-frequency current or voltage drop in the series resistor SR.

As explained in greater detail in the aforesaid Bird and Stevens application and illustrated in Fig. 6, with respect to reflected wave energy or energy traveling from the right hand end of the unit to the left hand end, the surge impedance $Zo$, together with the other resistors BR, TR and SR form a balanced Wheatstone bridge so that no voltage occurs between the points $c$ and $e$ and therefore no uni-directional component between points $b$ and $d$. With perfectly matched equipment and consequently no reflected energy, the direct-current indicator G reads "0."

With respect to forward traveling wave energy as illustrated in the lattice circuit of Fig. 7, there is no bridge balance and the signal generator voltage applied at the points $a$ and $g$ delivers current to a sampling circuit through the resistance elements SR, TR and BR, the bridging resistor BR actually passing physically through (though not making electrical contact with) the series resistor SR, so that the two sampling elements are located so near as posible in the same position physically with respect to the electromagnetic field in the space 31 between the outside and center conductors and provide a sample of the radio frequency electrical current and voltage at the same point at the same instant in the field, i.e., free of phase error, so as to give a genuine indication of the radio frequency power, which is obtained by relating current and voltage at the same point and instant.

Since, as shown also in Fig. 7, the peaking condenser 24 and the rectifier 21 are responsive to the joint action of the voltages in the series resistor SR and the terminating resistor TR, the rectified voltage, appearing on the peaking condenser 24 and effecting the galvanometer G, provides an indication of the forward energy.

Although the electrical circuits of a directional type insertion device have been shown in Fig. 7, for sake of illustration it should be understood that the physical construction of the unique series resistor SR and its relationship to associated elements in the hollow center conductor whereby the rectifier 21 is internally located, shielded from and symmetrical with respect to electromagnetic fields, and voltage and current samples are obtained at the same place, may be employed also in other apparatus such as non-directional indicators and control devices for example. Although not required in the construction illustrated, it will be understood that, if desired, conductor bands of silver or the like may be provided at the junctions of the metallic parts of the center conductor rod means at the points 83 and 84.

In accordance with the patent statutes, the principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What I claim and desire to secure by Letters Patent of the United States of America is:

1. In a reflectometer unit, outside and center coaxial conductors for insertion between a radio frequency energy source and a radio frequency load, the center conductor having a coaxial cylindrical chamber therein extending from a closed end to an open end, an insulator at the closed end of the cylindrical chamber having a contact fitting axially located therein, the said center conductor having a radial aperture at said closed end of the chamber, the outside conductor having a registering aperture opposite said radial aperture in the center conductor, an access resistor extending radially from the contact fitting within said insulator across the space between the outside and center conductors for bringing out a direct-current circuit, coaxial terminal type button condensers mounted coaxially in the chamber of said center conductor, said condensers having peripheral and center terminals, resistor units with terminal pins in the ends thereof mounted in said chamber alternately with said button condensers with the pin terminals inserted in the center terminals of said button condensers for supporting the resistors and forming a low pass filter unit for the direct current circuit, the contact fitting in said insulator being connected to the center terminal of the adjacent button condenser, an annular resistor unit of substantially the same external diameter as the center conductor, having first and second reduced-diameter ends and having a radial aperture extending through said resistor, said first end of the annular resistor unit being mounted in the open end of said center conductor chamber, an annular insulator mounted within said annular resistor unit having a radial aperture registering with the radial aperture in the resistor unit and having a bore with a second contact fitting mounted therein, said fitting having first and second contact sockets at opposite ends thereof, a rectifier unit having contact prongs at the ends thereof, one of said button condensers having a socket contact connected to the center terminal thereof extending toward the open end of said chamber, said rectifier unit being supported between said button condenser and said second contact fitting, the said rectifier contact pins fitting in the contact socket of the button condenser and the first contact socket of the second contact fitting for spacing the rectifier unit from the walls of the cylindrical chamber of said center conductor, a third contact fitting with an external diameter conforming substantially to that of the center conductor, having a tapered bore and an inner diameter at the larger end of the bore surrounding the second end of the annular resistor unit, the smaller end of the tapered bore being formed with spring contact fingers, a terminating resistor unit fitting between said contact fingers and the second contact socket of the second contact fitting, being thereby supported coaxially in said center conductor, and a second access resistor extending radially from the center of said second contact fitting through the radial apertures in said annular insulator and said annular resistor across the space between the outer conductor and the center conductor for completing the direct-current circuit through the rectifier and filter, providing a sampling circuit between said outside and center conductors through the annular resistor and the terminating resistor.

2. A center conductor for a coaxial-line insertion type reflectometer comprising conductive rod means having a cylindrical chamber therein coaxial with the rod means, the chamber extending between first and second ends, a hollow insulator mounted in the first end of the chamber having a first contact fitting therewithin, the hollow insulator and the chambered conductive rod means having a radial aperture whereby electrical connection may be made with the first contact fitting from externally without making electrical connection to the conductive rod means, a second contact fitting mounted in the second end of the said chamber having contact fingers at one end and being electrically connected at the other end to the conductive rod means, said contact fingers being coaxial with the rod means, an annular resistor unit mounted in said conductive rod chamber adjacent the second contact fitting, with an outside diameter conforming to that of the rod means, and being interposed therein for completing a radio frequency electrical circuit between portions of the conductive rod means on either side of the second end of the chamber, an annular insulator within said annular resistor unit, a third contact fitting within said annular insulator, said annular insulator and annular resistor unit having radial registering apertures whereby a second electrical connection may be made from externally to the said third contact fitting without contacting the rod means, a terminating resistor mounted between said second and third contact fittings coaxially with respect to said conductor rod received in the contact finger of the second contact fitting, a rectifier unit having aligned contact pins at opposite ends thereof, a condenser resistor filter unit axially mounted within said chamber adjacent the first contact fitting at the first end of the chamber with a pair of center contacts, one center contact being connected to said first contact fitting and said rectifier unit being mounted between the second center contact and said third contact fitting for insulatingly supporting said rectifier within said chamber spaced from the walls thereof and including it in an electrical circuit between the filter unit and the said third contact fitting.

3. In a coaxial line type reflectometer having an outer conductor, center conductor means therefor comprising a conductor rod having a coaxial chamber in one end thereof, said chamber having a closed end and an open end, a second conductor rod having contact means at the end thereof with inwardly extending contact fingers, an annular resistor mounted in the open end of said chamber of the first conductor rod electrically connecting the open end of the first conductor rod and the end of the second conductor rod, the two rods being mounted in alignment whereby said annular resistor constitutes series resistance within the center conductor means, an annular insulator mounted within said annular resistor with a contact fitting mounted therewithin, a terminating resistor mounted between said contact fitting and the contact fingers of the second conductor rod electrically connected at the ends to said fitting and said contact fingers and coaxial with the center conductor means, a hollow insulator within the chamber of the first conductor rod at the closed end of said chamber, a contact fitting mounted within said hollow insulator and a rectifier coaxially mounted within said chamber having contact pins, one electrically connected to said contact fitting in the hollow insulator and the other electrically connected to the contact fitting within the annular insulator in the annular resistor, said hollow insulator and the adjacent portion of the first conductor rod having registering radial apertures, the annular resistor and the annular insulator therewithin likewise having registering radial apertures whereby electrical connections may be brought into said center conductor means to the rectifier contact pins without making electrical contact with the center conductor means.

4. Center conductor means as in claim 3 wherein a filter unit is mounted within the chamber in the first conductor rod between the closed end thereof and the rectifier unit for filtering radio frequency energy out of the circuit of the rectifier unit.

5. Center conductor means as in claim 4 wherein the filter unit comprises button type condenser means having peripheral contact means making electrical contact with the first conductor rod at the surface of the chamber and center terminal means, and resistor means, the resistor means being connected serially between the contact fitting in the hollow insulator and one of the contact pins of the rectifier, the said contact pin and the said contact fitting in the hollow insulator making electrical contact with center terminal means of the condenser means.

6. A center conductor for coaxial line insertion type reflectometers comprising conductive rod means having a chamber therein coaxial with the rod means and extending between first and second ends, an annular resistor interposed in said conductive rod means adjacent the second end of the chamber for introducing the resistance of said annular resistor serially in said conductive rod means between the ends thereof, a first contact fitting within the first end of said chamber insulated therefrom, the rod means having a radial aperture in the first end of the chamber for enabling electrical connection to be made to said contact fitting from externally without making electrical connection to the conductive rod means, a second contact fitting mounted within said annular resistor and insulated therefrom, a terminating resistor mounted in the second end of said chamber coaxially with said rod means electrically connected between the rod means at the second end of said chamber and said second contact fitting, and a rectifier mounted within said chamber with electrical connections to said first and second contact fittings, said annular resistor having a radial aperture whereby a second electrical connection may be made thereto from externally without contacting said rod means for enabling a direct-current electrical circuit extending externally to be made to said rectifier, and forming a sampling circuit including said rectifier, said annular resistor and said terminating resistor, said second connection being symmetrical with respect to the ends of said annular resistor.

7. A resistance sampling unit for an insertion type measuring unit for radio frequency circuits employing coaxial transmission lines, said sampling unit comprising in combination an annulus composed of resistance material for forming a series resistor to be interposed in a high frequency transmission line conductor, a contact fitting mounted within said annulus insulated therefrom, a tapered connector of conductive material mounted adjacent said annulus coaxial therewith having a larger diameter bore end electrically connected to the annulus and a smaller diameter bore end forming a socket contact, and a terminating resistor mechanically and electrically connected between said socket contact and said contact fitting within the resistive annulus coaxial therewith for enabling a voltage sample to be obtained, said annulus having a radial aperture for enabling an electrical connection from externally to be brought to said contact fitting in a circuit including the terminating resistor and the annulus as a series resistor without making direct electrical connection with said annulus.

8. A resistance sampling unit for an insertion type measuring unit for radio frequency circuits employing coaxial transmission lines, said sampling unit comprising hollow transmission line conductor means, a tubular insulator of generally circular cross section having a cylindrical central portion and reduced end portions, a resistive film on the cylindrical portion of the insulator to be interposed between axially spaced portions of said transmission line conductor means for forming a series resistor between such conductor portions with the latter received over the reduced end portions of the insulator, a contact fitting disposed within the insulator and supported thereby insulated from the resistive film and the conductor means, a sampling circuit comprising elements disposed within the conductor means in insulated relation, means electrically connecting said elements together and to said contact fitting, one of said elements being mechanically connected to the contact fitting and supported thereby, and said insulator and the resistive film thereon being apertured at a point between and spaced from the reduced end portions of the insulator for enabling an electrical connection from externally of the conductor means to be brought through the resistive film intermediate its ends to said contact fitting without making direct electrical connection with the conductor means or the resistive film.

9. A resistance sampling unit for an insertion type measuring unit for radio frequency circuits employing coaxial transmission lines, said sampling unit comprising in combination an annulus composed of resistance material for forming a series resistor to be interposed in a high frequency transmission line conductor, a contact fitting disposed within said annulus and insulated there from, a tubular connector of conductive material mounted adjacent said annulus and coaxial therewith, said tubular connector having one end electrically connected to the resistive annulus and a remote end forming a contact, and a terminating resistor mechanically and electrically connected between said remote end contact and said contact fitting for enabling a voltage sample to be obtained, said resistive annulus having a radial aperture for enabling an electrical connection from externally to be brought to said contact fitting in a series resistive circuit including the terminating resistor and the resistive annulus without making direct electrical connection with said resistive annulus.

10. A center conductor for coaxial line insertion type reflectometers comprising conductive rod means formed with an internal chamber extending between first and second ends, an annular resistor interposed in said conductive rod means adjacent the second end of the chamber for introducing the resistance of said annular resistor serially in said conductive rod means between the ends thereof, a first contact fitting within the first end of said chamber and insulated from the rod means, said rod means having a radial aperture communicating with the first end of the chamber for enabling electrical connection to be made to said contact fitting from externally without making electrical connection to the conductive rod means, a second contact fitting mounted within said annular resistor and insulated therefrom, a terminating resistor in said chamber and electrically connected between the rod means and said second contact fitting, a rectifier in said chamber, means connecting said rectifier in an electrical circuit between said first and second contact fittings, said annular resistor having a radial aperture whereby a second electrical connection may be made thereto from externally without contacting said rod means for enabling a direct current electrical circuit extending externally to be made to said rectifier whereby to provide a sampling circuit including said rectifier, said annular resistor and said terminating resistor.

11. In a coaxial line type reflectometer having an outer conductor, center conductor means therefor comprising a first conductor rod formed with a chamber having a closed end and an open end, a second conductor rod having inwardly extending contact fingers, an annular resistor mounted in the open end of said chamber of the first conductor rod, said resistor electrically connecting the first conductor rod and the second conductor rod, the two rods being mounted in alignment whereby said annular resistor constitutes series resistance in the center conductor means, a first contact fitting within said annular resistor, a terminating resistor mounted between and electrically connected at its ends to said contact fitting and to the contact fingers of the second conductor rod, insulating means within the chamber of the first conductor rod at the closed end of said chamber, a second contact fitting supported by said insulating means, a rectifier within said chamber and having contact terminals, means electrically connecting one terminal of the rectifier to said contact fitting in the hollow insulator and another terminal of the rectifier to the contact fitting within the annular resistor, said first conductor rod having an aperture adjacent said first contact fitting, and the annular resistor having a radial aperture adjacent the second contact fitting whereby electrical connections may be brought into said center conductor means to the rectifier terminals without making electrical contact with the center conductor means.

12. A center conductor for a coaxial-line insertion type reflectometer comprising cylindrically surfaced conductive rod means having axially spaced aligned portions and an internal chamber, insulator means in the chamber, a first contact fitting supported by said insulator means, the insulator means and the chambered conductive rod means having a radial aperture whereby an electrical connection may be made with the first contact fitting from externally without making electrical connection to the conductive rod means, a second contact fitting in the chamber, said second fitting having contact fingers at one end and being electrically connected at the other end to the conductive rod means, annular cylindrically surfaced resistor unit adjacent the second contact fitting and interposed between and electrically connected to the spaced portions of the rod means with an outside diameter conforming to that of the rod means, for completing a radio frequency electrical series circuit between such spaced portions of the conductive rod means, a third contact fitting in the space between the aligned portions of the rod means and within said annular resistor, said annular resistor unit having a radial aperture whereby a second electrical connection may be made from externally to the said third contact fitting without contacting the rod means, a terminating resistor mounted between said second and third contact fittings, a rectifier unit having contacts at opposite ends thereof and a filter unit within said chamber, and means connecting the rectifier and the filter units in a series circuit between the first and third contact fitting, one center contact being connected to said first contact fitting and said rectifier unit being mounted between the second center contact and said third contact fitting for insulatingly supporting said rectifier within said chamber spaced from the walls thereof and including it in an electrical circuit between the filter unit and the said third contact fitting.

References Cited in the file of this patent

UNITED STATES PATENTS

| | | |
|---|---|---|
| 2,129,947 | Lazarus | Sept. 13, 1938 |
| 2,324,961 | Stoffel | July 20, 1943 |
| 2,587,055 | Marshall | Feb. 26, 1952 |
| 2,667,622 | Weber et al. | Jan. 26, 1954 |